United States Patent Office.

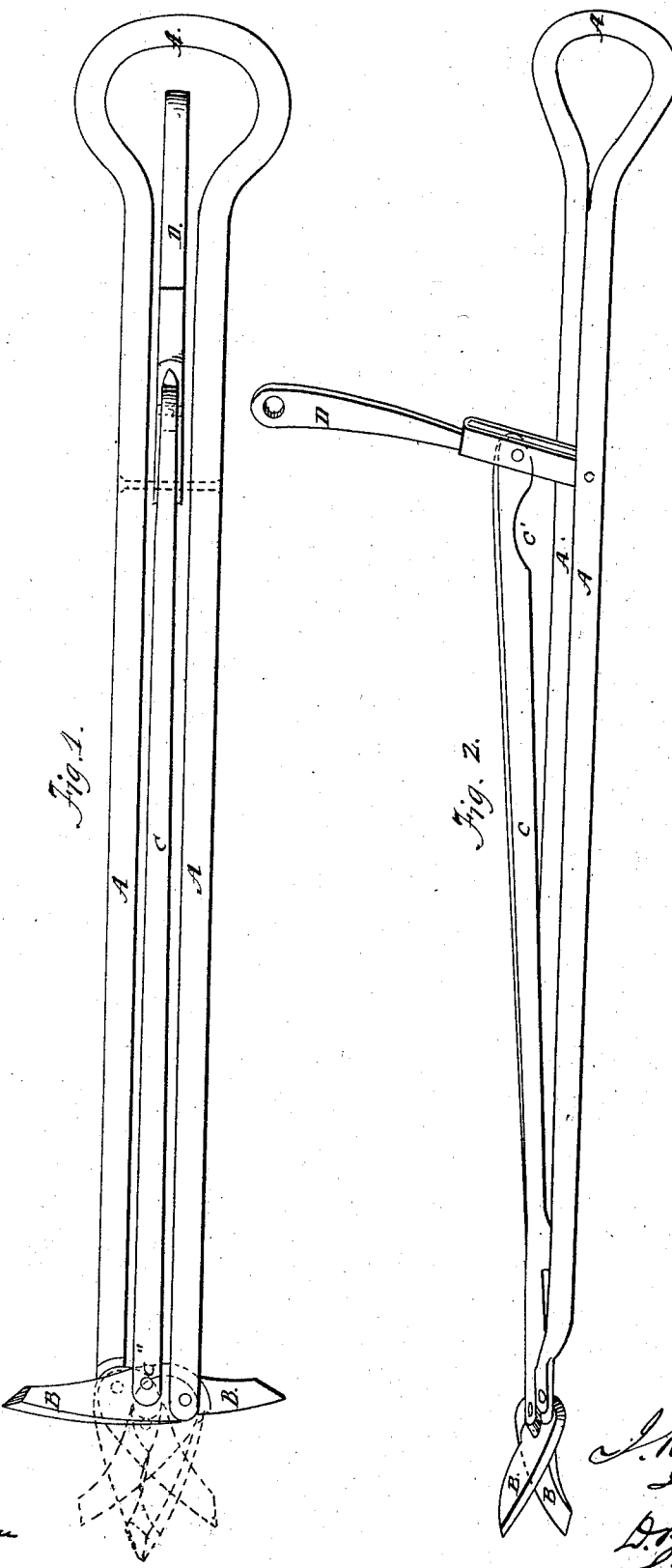

J. R. LYONS, OF MONTROSE, PENNSYLVANIA.

Letters Patent No. 74,103, dated February 4, 1868.

IMPROVEMENT IN HORSE HAY-FORKS.

The Schedule referred to in these Letters Patent and making part of the same.

TO ALL WHOM IT MAY CONCERN:

Be it known that I, J. R. LYONS, of Montrose, in the county of Susquehanna, and State of Pennsylvania, have invented a new and useful Improvement in Hay-Forks; and I do hereby declare the following to be a full, clear, and exact description of the same, reference being had to the annexed drawings, making part of this specification, in which—

Figure 1 is a front elevation, and
Figure 2 is a side elevation.

The same letters are employed in both figures in the designation of identical parts.

My invention consists in the arrangement for actuating the adjustable oscillating tines of a hay-fork, as follows:

A is a rod, bent as shown in fig. 1. On the ends of the rod forming the shank of the fork, I attach the oscillating tines B, constructed as shown in the drawings. They are pivoted to the rod so as to oscillate, crossing one another when extended, until they stand at right angles to the rod A. They are actuated by the rod C, one end of which is hinged to the lever D, and the other attached by a pivot to the shoulders of both oscillating tines. A reciprocating motion may be given to the rod C, by the lever D, which is attached between the parallel legs of the rod A. The rod C being pressed down, the tines are brought together, forming a sharp point, and presenting also sharp edges, which may be pressed into the hay to be raised. By throwing up the lever D and rod C, the tines will be extended at right angles, crossing one another, and the load of hay may now be raised by a rope fastened in the loop in the end of the shank A. The rod C is cut away on one side, at $C^1$, so that the lever D may be thrown back beyond the right line, extending from the point of attachment at $C^2$ to the point of suspension. The load upon the tines will therefore act upon the lever D, to hold it in place, as that load will draw it back. When it is desired to discharge the load, by drawing upon a cord attached to the lever D, the latter may be thrown forward until it passes in front of the line of suspension, when the load will act upon it to draw it down, and permit the tines to close, thus releasing the hay carried upon it, which will fall into the desired place.

I am aware that forks for elevating hay have been formed with oscillating tines, and do not claim broadly this feature of my invention; but What I do claim as my invention, and desire to secure by Letters Patent, is—

In combination with the shank A, and oscillating tines B, the rod C and lever D, when said rod is cut away at $C^1$, so that when the tines are extended, the point of attachment of the lever and rod shall be behind the pivot of the lever, so that the weight of the load shall act to hold back the lever with a force proportioned to the weight of the load, substantially as set forth.

In testimony whereof, I have signed my name to this specification in the presence of two subscribing witnesses.

J. R. LYONS.

Witnesses:
    JOHN S. HOLLINGSHEAD,
    JOHN D. BLOOR.